Nov. 26, 1935. G. A. LYON 2,022,125
BEADING FOR TIRE COVERS AND METHOD OF APPLYING SAME
Original Filed Jan. 2, 1932
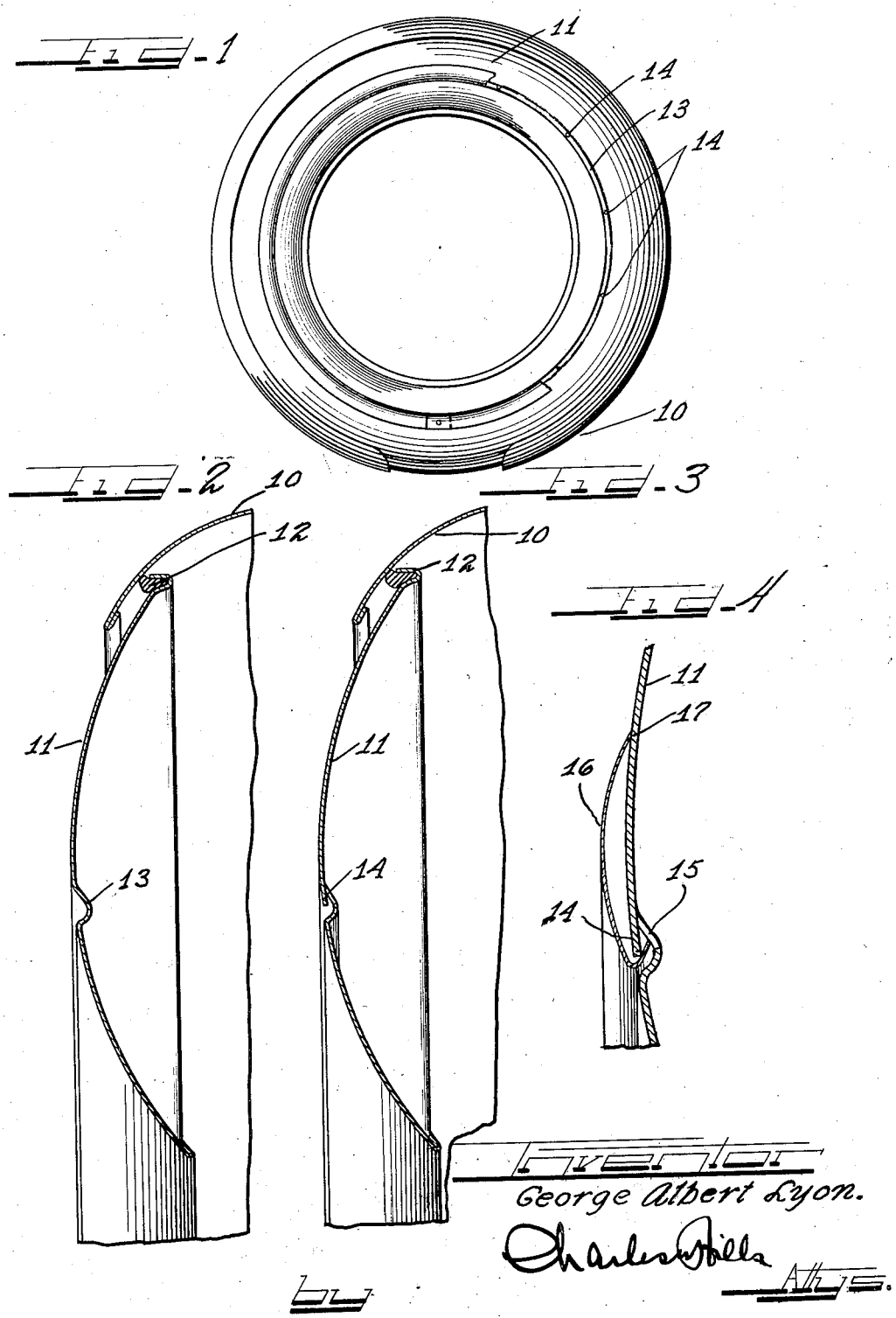
Inventor
George Albert Lyon.
by Charles W. Hills
Attys.

Patented Nov. 26, 1935

2,022,125

UNITED STATES PATENT OFFICE 2,022,125

BEADING FOR TIRE COVERS AND METHOD OF APPLYING SAME

George Albert Lyon, Allenhurst, N. J., assignor to Lyon, Incorporated, a corporation of Delaware Application January 2, 1932, Serial No. 584,558
Renewed May 1, 1933

9 Claims. (Cl. 150—54)

This invention relates to spare tire covers, and more particularly to beading therefor and a method of applying the same to the cover.

It is an object of this invention to provide improved and simplified tire cover beading as well as a novel and economical method of applying the same to the cover.

In accordance with the general features of this invention, there is provided a cover portion having a ring like groove provided at spaced intervals with upset tangs and a ring like beading strip for cooperation with the cover portion and having a turned back edge formed to engage under the plurality of tangs in the ring like groove to aid in securing the ring like bead to the cover portion.

Another feature of the invention relates to the method of applying this ring like bead to the cover which consists in first forming a ring like groove in the cover, then upsetting at spaced intervals in said groove a plurality of tangs, and lastly snapping the marginal edge of the ring like bead into the groove and under the tangs so that the tangs may aid in retaining the bead on the cover.

Other objects and features of this invention will more fully appear from the following detail description taken in connection with the accompanying drawing, which illustrates a single embodiment thereof, and in which Figure 1 is a side view of a cover embodying the features of this invention with a portion broken away to show the spaced tangs in the ring like groove formed in the cover;

Figure 2 is an enlarged fragmentary cross-sectional view through the cover and illustrating the first step in the forming of the ring like groove in a portion of the cover;

Figure 3 is a sectional view similar to Figure 2 differing therefrom in that it shows another step in the novel method of applying a bead to the cover, namely, the step of upsetting a plurality of spaced tangs in the ring like groove; and Figure 4 is an enlarged fragmentary sectional view similar to the other two figures and illustrating the manner in which the ring like bead is snapped into position on the cover and into engagement with the plurality of tangs in the ring like groove.

On the drawing:

In order to illustrate an embodiment of my invention, I have selected a cover of the type disclosed in my U. S. Letters Patent No. 1,807,697, which issued on June 2, 1931, but it is of course to be understood that my novel tire cover beading and method of applying the same is not limited to any particular tire cover construction or design since it may be employed with equal advantage in connection with other forms of covers.

The cover illustrated in the drawing is of the well-known Lyon two-part type and includes a split rim 10 and a ring like side plate 11 which is adapted to cooperate with the rim so as to be retained on the tire, all as disclosed in my aforesaid Letters Patent. It will of course be appreciated that my patented two-part cover utilizes the inherent resiliency of the split rim to retain the cover on the tire. That is to say, the rim at all times has a tendency to contract to a diameter less than the outer diameter of the tire, and as a result the rim is urged into retained engagement with the tire and also into retaining engagement with the beaded outer edge 12 of the side plate 11 so as to hold this side plate in proper position on the outer side wall of the spare tire.

The beaded edge 12 of the plate 11 may include a cushioning medium so as to prevent rattling of the parts.

A portion of this tire cover which in the present illustration is shown as comprising the side plate 11 is provided with a ring like depression or groove 13 which may be formed in that part or plate 11 by any suitable apparatus. For example, this groove 13 may be depressed in the plate 11 by suitable press apparatus or, on the other hand, it may be formed therein by stretching, rolling or some other similar process.

After this ring like depression or groove 13 has been formed in the cover part, a plurality of offset tangs 14 are punched from the bottom of the groove into the confines of the groove 13 proper. These tangs 14, as best shown in Figures 1 and 2 are disposed at spaced intervals in the groove 13 and are spaced from the bottom of the groove 13 so as to enable a turned edge 15 of a ring-like bead 16 to be disposed thereunder (Figure 4). This ring-like bead 16, like the side part 11, is convexly curved and has its outermost marginal edge disposed for tight frictional engagement at 17 with the outer surface of the side plate 11. The inner marginal edge of the ring like bead 16 is turned back upon itself at 15 and spaced from the main body of the beading 16 so that the tangs 14 may be disposed between the turned edge 15 and the body of the bead proper.

The application of this ring like bead 16 to the cover part 11 is thought to be readily evident from an inspection of the disclosure in the accompanying drawing. All that has to be done in order to secure the beading in place on the cover is to slip the inturned portion 15 of the bead into the ring like groove 13 and then to snap it past the tangs so that the tangs will be disposed between the inturned edge 15 and the bead proper. In other words, the bead is so formed as to be snapped into tight engagement with the side part 11. Once it is in its engaged position the outermost edge of the bead is in tight frictional cooperation at 17 with the outer surface of the plate part 11 and the inner marginal portion of the bead is in tight cooperation with the tangs and the groove 13.

This construction is very advantageous in that it enables the cover to be finished independently of the bead so that any suitably finished or colored bead may be later applied to the cover. Thus, for example, the cover may be shipped to a car manufacturer without the bead so that the car manufacturer may finish the bead to its own particular requirements and then apply the same to the cover by snapping it into position as described above.

Now I desire it understood that although I have illustrated and described in detail the preferred embodiment of this invention, the invention is not to be thus limited but only insofar as defined by the scope and spirit of the appended claims.

I claim as my invention:

1. In a tire cover, a beading construction therefor comprising a plurality of tangs formed to extend at spaced intervals into a ring like groove in a part of the cover, and a ring like bead having one edge formed to extend into said groove under said tangs so that said bead may be held thereby in tight cooperation with the cover part.

2. In a tire cover, a beading construction therefor comprising a plurality of tangs formed to extend at spaced intervals into a ring like groove in a part of the cover, and a ring like bead having one edge formed to extend into said groove under said tangs so that said bead may be held thereby in tight cooperation with the cover part, said bead being flexible whereby it may be bodily snapped into tight cooperation with said tangs and cover part.

3. In a tire cover, a beading construction therefor comprising a plurality of tangs formed to extend at spaced intervals into a ring like groove in a part of the cover, and a ring like bead having one edge formed to extend into said groove under said tangs so that said bead may be held thereby in tight cooperation with the cover part, said edge of said bead being turned back upon itself so that said tangs may extend between said edge and the bead proper.

4. In a tire cover, a beading construction therefor comprising a plurality of tangs formed to extend at spaced intervals into a ring like groove in a part of the cover, and a ring like bead having one edge formed to extend into said groove under said tangs so that said bead may be held thereby in tight cooperation with the cover part, said ring like bead being of convex cross-section whereby its other edge will tightly and frictionally engage the surface of the cover part when its first mentioned edge is in cooperation with said tangs.

5. In a tire cover beading construction for a given tire cover part having a ring like groove and a plurality of spaced projections extending into said groove, a ring like bead having one edge turned back upon itself so that said edge may be snapped into said groove with said projections between said edge and the bead proper to hold the bead on said part.

6. In a tire cover beading construction for a given tire cover part having a ring like groove and a plurality of spaced projections extending into said groove, a ring like bead having one edge turned back upon itself so that said edge may be snapped into said groove with said projections between said edge and the bead proper to hold the bead on said part, said bead being transversely curved so that when it is on said part its other edge will tightly embrace the surface of said part.

7. A tire cover having molding retaining means projecting therefrom in a longitudinally curved arrangement, and a molding receiving, binding, protecting, and ornamenting said means, said molding comprising a channeled split resilient ring having its channel opening substantially radially outwardly and having an inherent tendency to expand radially as it is snapped into place on said means.

8. A tire cover having molding retaining means projecting therefrom in a longitudinally curved arrangement, and a molding receiving, binding, protecting, and ornamenting said means, said molding comprising a channeled split resilient ring having its channel opening in a substantially radial direction and having an inherent tendency to spring radially as it is snapped into place on and receives said means in order to lock and secure itself on said means by its own resiliency and the rigidity of said means.

9. A tire cover member having molding retaining means arranged so as to form therewith a longitudinally curved recess, a molding telescoped over said means and having a portion disposed in said recess, said molding being expansible and contractible and said portion engaging said means under pressure, one side margin of said molding engaging in said groove and being the only margin of said molding connected to said member.

GEORGE ALBERT LYON.